(12) United States Patent
Deyerl

(10) Patent No.: US 8,109,381 B2
(45) Date of Patent: Feb. 7, 2012

(54) APPARATUS FOR SORTING PIECE GOODS

(75) Inventor: Heinrich Deyerl, Teunz (DE)

(73) Assignee: Krones AG (DE)

( * ) Notice: Subject to any disclaimer, the term of this patent is extended or adjusted under 35 U.S.C. 154(b) by 507 days.

(21) Appl. No.: 12/336,663

(22) Filed: Dec. 17, 2008

(65) Prior Publication Data

US 2009/0155036 A1    Jun. 18, 2009

(30) Foreign Application Priority Data

Dec. 17, 2007 (DE) .................. 10 2007 061 196

(51) Int. Cl.
*B65G 47/14* (2006.01)

(52) U.S. Cl. .................. 198/389; 198/398; 209/541

(58) Field of Classification Search .................. 198/389, 198/398, 400, 407, 454, 550.01, 620, 625; 209/521, 541, 616, 617, 707, 917
See application file for complete search history.

(56) References Cited

U.S. PATENT DOCUMENTS

| | | | |
|---|---|---|---|
| 3,433,966 A * | 3/1969 | Letch et al. ............... | 250/223 B |
| 3,439,791 A | 4/1969 | Matthews et al. | |
| 3,721,328 A | 3/1973 | Drew | |
| 4,353,678 A | 10/1982 | Gott et al. | |
| 4,420,073 A | 12/1983 | Hausler et al. | |
| 4,688,373 A | 8/1987 | Parlour | |
| 4,727,989 A * | 3/1988 | Cotic et al. ............... | 209/546 |
| 4,898,270 A * | 2/1990 | Hopkins et al. ............... | 198/396 |
| 4,909,375 A * | 3/1990 | Cotic et al. ............... | 198/393 |
| 4,911,282 A * | 3/1990 | Melnikov et al. ............... | 198/396 |
| 5,404,991 A * | 4/1995 | Nakamura ............... | 198/400 |
| 6,415,902 B1 * | 7/2002 | Vis et al. ............... | 198/384 |
| 6,968,936 B2 * | 11/2005 | Charpentier ............... | 198/389 |
| 7,246,701 B2 * | 7/2007 | Lanfranchi ............... | 198/860.1 |
| 7,322,458 B1 * | 1/2008 | McDonald et al. ............... | 198/389 |
| 7,337,893 B2 * | 3/2008 | Charpentier ............... | 198/454 |
| 7,861,845 B1 * | 1/2011 | Lapointe ............... | 198/383 |
| 2004/0109747 A1 | 6/2004 | Charpentier | |

FOREIGN PATENT DOCUMENTS

| | | |
|---|---|---|
| DE | 1106245 B | 5/1961 |
| DE | 2365779 | 5/1976 |
| DE | 602004001132 | 5/2007 |
| EP | 1690813 A1 | 8/2006 |
| FR | 2424122 A1 | 11/1979 |

(Continued)

OTHER PUBLICATIONS

International Search Report dated, Feb. 13, 2009 in corresponding International Application No. EP08171279.

(Continued)

*Primary Examiner* — Douglas Hess
(74) *Attorney, Agent, or Firm* — Onello & Mello LLP

(57) ABSTRACT

The invention relates to an apparatus and method for sorting piece goods. The apparatus comprises a sorting arrangement which comprises two rollers arranged parallel to one another, wherein these rollers can rotate about their longitudinal direction and wherein the rollers are configured in such a way that the piece goods are transported along the rollers, and comprising a transport device which conveys the piece goods in the direction of the sorting arrangement. According to certain embodiments, arranged above the transport device are displacement devices which make contact with the piece goods at least temporarily and displace said piece goods relative to the transport device.

20 Claims, 2 Drawing Sheets

FOREIGN PATENT DOCUMENTS

| | | | |
|---|---|---|---|
| FR | 2556273 | A1 | 6/1985 |
| FR | 2802903 | A1 | 6/2001 |
| GB | 667892 | A | 3/1952 |
| GB | 2022536 | A | 12/1979 |
| GB | 2041899 | A | 9/1980 |
| GB | 1597177 | A | 9/1981 |
| GB | 2070546 | A | 9/1981 |
| JP | 2002321815 | A | 11/2008 |
| WO | 0236466 | A1 | 5/2002 |
| WO | 2004069700 | A1 | 8/2004 |
| WO | 2006082604 | A1 | 8/2006 |
| WO | 2006084831 | A1 | 8/2006 |

OTHER PUBLICATIONS

Search Report issued in corresponding German Application No. 10 2007 061 196.1.

* cited by examiner

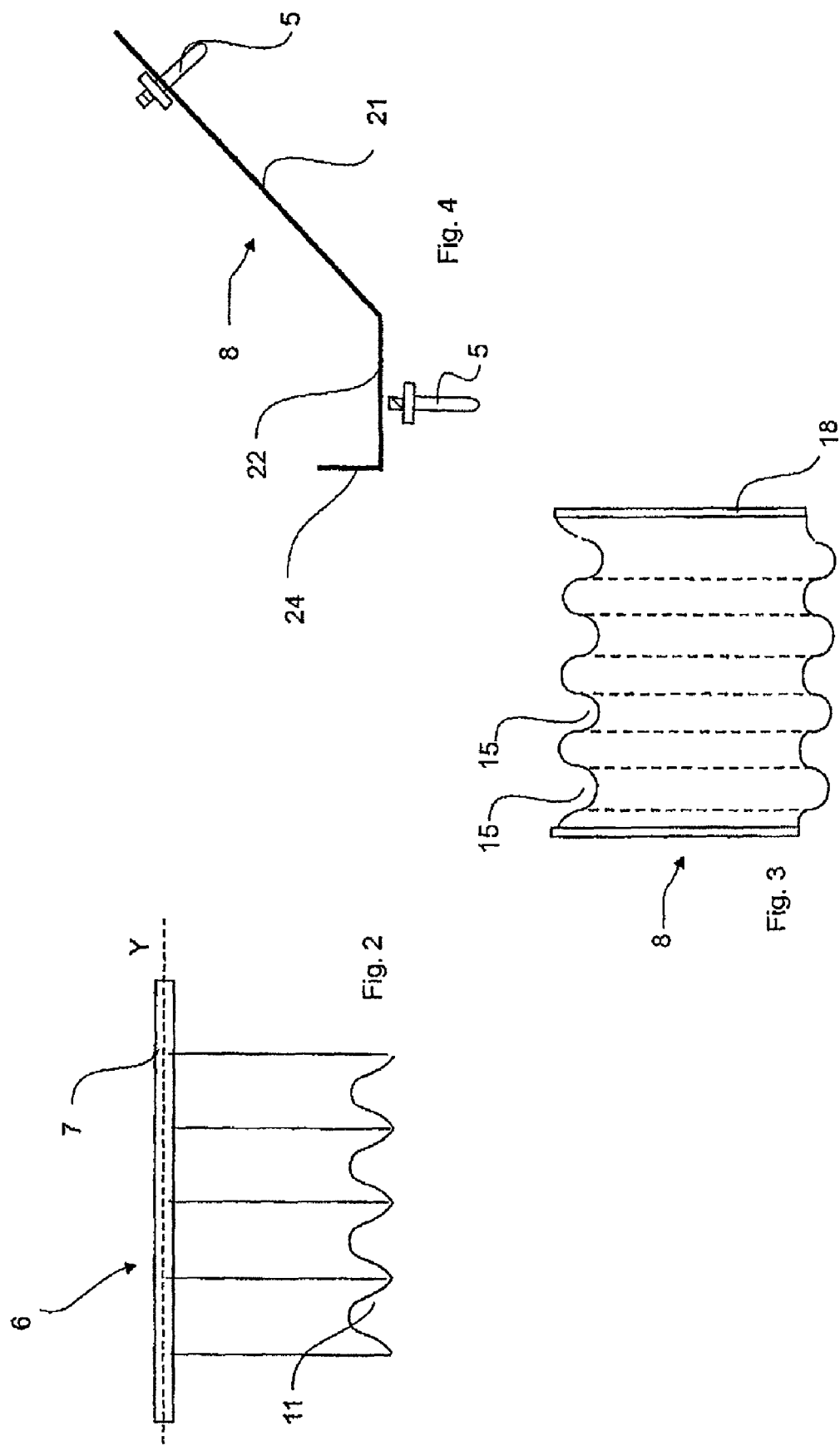

APPARATUS FOR SORTING PIECE GOODS

RELATED APPLICATIONS

This application relies for priority upon German Patent Application No. 10 2007 061 196.1, filed on Dec. 17, 2007, the content of which is herein incorporated by reference in its entirety.

DESCRIPTION

The present invention relates to an apparatus for sorting piece goods. The apparatus will be described with reference to preforms to be sorted, which in the context of producing beverage containers are expanded in a further method step to form plastic bottles. However, the present invention is also applicable to other types of piece goods.

Such apparatuses for sorting piece goods are known from the prior art and serve to bring unordered piece goods into a certain predefined order and then to be able to further treat the ordered piece goods in a further method step.

A method for producing plastic bottles is known from FR 2 556 273. In said document, two rollers are used which rotate in opposite directions relative to one another and which are spaced apart from one another in such a way that a region of the piece goods passes into the intermediate space between the two rollers but the piece goods cannot slip through between the two rollers. By virtue of the rotational movement of the rollers, the piece goods are transported separately and in a predefined direction. Also provided is a transport belt which transports the as yet unordered piece goods in the direction of the two rollers.

However, in modern installations for producing plastic containers, increasing significance is being placed on a high production speed. Since the piece goods arrive at the two rollers in a completely unsorted fashion, the problem sometimes arises that the two rollers can no longer cope with the high quantity of piece goods arriving in an unordered fashion.

The object of the present invention is therefore to provide an apparatus for sorting piece goods which can also be operated at higher operating speeds.

Objects of certain inventive concepts can be achieved according to various embodiments disclosed herein, including various apparatus and methods for sorting piece goods.

The apparatus according to the invention for sorting piece goods comprises a sorting arrangement which comprises two rollers arranged parallel to one another, wherein these rollers can rotate about their longitudinal direction and are configured in such a way that the piece goods are transported along these rollers, more specifically along the longitudinal direction of the rollers. Also provided is a transport device which conveys the piece goods in the direction of the sorting arrangement. According to the invention, arranged above the transport device is at least one displacement device which makes contact with the piece goods at least temporarily and displaces said piece goods relative to the transport device.

However, the sorting arrangement may also be designed as a "sorting disc", in which a disc is arranged in a rotatably mounted manner, onto which the piece goods to be sorted are fed. Due to the rotation of the disc and the resulting centrifugal force, the piece goods are conveyed to the edge of the disc, where a bar is arranged at such a distance above the disc that one part of the piece goods can pass through between the bar and the disc, while another part—due to a larger diameter—remains suspended. The region of larger diameter may be for example the neck ring region of a preform to be sorted for producing a bottle.

By virtue of the displacement of the piece goods relative to the transport device, a certain presorting of the piece goods is carried out on the transport device. This presorting means that the piece goods no longer arrive at the sorting arrangement in a completely unsorted fashion, but rather a certain degree of order has already been achieved. The sorting arrangement comprising the two parallel rollers is also known in the prior art as a Tanner conveyor. The centrifugal sorting arrangement is often referred to as a disc sorter. This presorting may in principle be used on all sorting systems available on the market. Since, as mentioned above, the machine sizes and also the machine capacities are constantly increasing in the prior art, the respectively used Tanner conveyors and disc sorters are also becoming larger and more expensive in the prior art. According to the invention, a presorting or preorientation of the piece goods, that is to say of the preforms, upstream of or in front of the actual sorting arrangement is proposed.

The piece goods are therefore not fed to the sorting arrangement every which way as in the prior art but rather, by means of a preorientation with a targeted metering, the sorting arrangement can be built more efficiently and thus in a smaller, more space-saving and less expensive manner.

In one advantageous embodiment, the displacement device comprises at least one plate which can pivot in the transport direction of the piece goods, said plate being arranged in such a way that the piece goods make contact at least temporarily with a section of these pivotable plates during transport on the transport device. More specifically, on the transport device, the piles of piece goods which were originally located every which way on top of one another are brought separately onto a predefined preform plane by means of pivotable plates which hang downwards.

Preferably, the transport device is a transport belt. Furthermore, the transport device is advantageously arranged in such a way that the piece goods on the transport device are conveyed essentially perpendicular to the longitudinal direction of the roller. In this way, a particularly efficient transfer of the piece goods from the transport device to the rollers is possible.

In a further advantageous embodiment, at least three pivotable plates are arranged one behind the other in the transport direction of the piece goods on the transport device. It is thus possible, by means of a plurality of such plates, to orient the preforms in the transport direction since the carrier ring of these preforms usually has a larger diameter than the preform body. Experience has shown that, by arranging one plate, approximately 75% of the arriving piece goods have an orientation in which the thread points away from the transport direction and 24% of the piece goods have an orientation in which the thread points in the transport direction. Only 1% of the piece goods still continue to lie transversely to this transport direction.

These piece goods which have already been presorted can then be received more easily by the sorting arrangement.

In a further advantageous embodiment, at least one of the pivotable plates has a recess on a side facing towards the transport device. This may be for example an arc-shaped recess which is configured in such a way that the body of the preform easily passes through it and the carrier ring remains suspended. If a preform is then transported in the direction of this recess, there is a high probability that the preform will be aligned in the desired final position.

In a further advantageous embodiment, at least two plates arranged one behind the other have recesses on the side facing towards the transport device, and these recesses are arranged one behind the other in the transport direction of the piece goods on the transport device. More specifically, these recesses are located directly behind one another in the transport device or are substantially congruent with one another in a view as seen in the transport direction. In this way, the arriving piece goods are successively rotated into a desired position by the individual plates with the recesses.

In a further advantageous embodiment, at least one plate has a plurality of recesses located next to one another perpendicular to the transport device. In this way, the throughput as a whole can be increased since the orientation according to the invention can be carried out on a plurality of lines arranged next to one another.

In a further advantageous embodiment, provided between the transport device and the sorting arrangement is a slide arrangement, along which the piece goods can slide from the transport device to the sorting device. Here, the piece goods which have already been presorted are advantageously brought via the slide device onto the sorting device located below the transport device.

In a further advantageous embodiment, this slide device has depressions extending between the transport device and the sorting arrangement. More specifically, this slide device is a type of corrugated or trapezoidal plate so that the preforms can no longer rotate once they have left the transport device. In addition, tubes which are arranged next to one another in a defined manner may be provided, which would give rise to the further positive side-effect that foreign particles which have reached the transport device can drop downwards.

Preferably, these depressions in the slide device have a constant cross section.

With particular preference, the piece goods are containers and in particular preforms.

The present invention also relates to a method for sorting piece goods, wherein the piece goods are conveyed by a transport device onto a sorting arrangement and, by means of two rollers which are rotated about their parallel longitudinal directions, are conveyed on the sorting arrangement along these longitudinal directions. Arranged between the two rollers is an intermediate space which receives at least a region of the piece goods. According to the invention, the piece goods during transport on the transport device are moved or displaced relative to the transport device by means of a displacement device.

Also in the method according to the invention, therefore, a presorting of the piece goods is already carried out on the transport device.

In a further advantageous embodiment, the piece goods are displaced relative to the transport device by a first displacement device, then rest relative to the transport device for a predefined period of time during the movement on the transport device and then are displaced again relative to the transport device by a second displacement device. This means that the orientation of the piece goods on the transport device takes place in stages or in the above-described manner in stages by means of a plurality of pivotable plates arranged one behind the other.

With particular advantage, an apparatus of the type described above is used for sorting the piece goods.

Further embodiments and examples will emerge from the appended drawings:

In the drawings:

FIG. 2 shows a view of a pivotable plate in a plan view in the transport direction;

FIG. 3 shows a plan view of a slide device according to the invention; and

FIG. 4 shows a slide device in a further embodiment.

Figure 1:
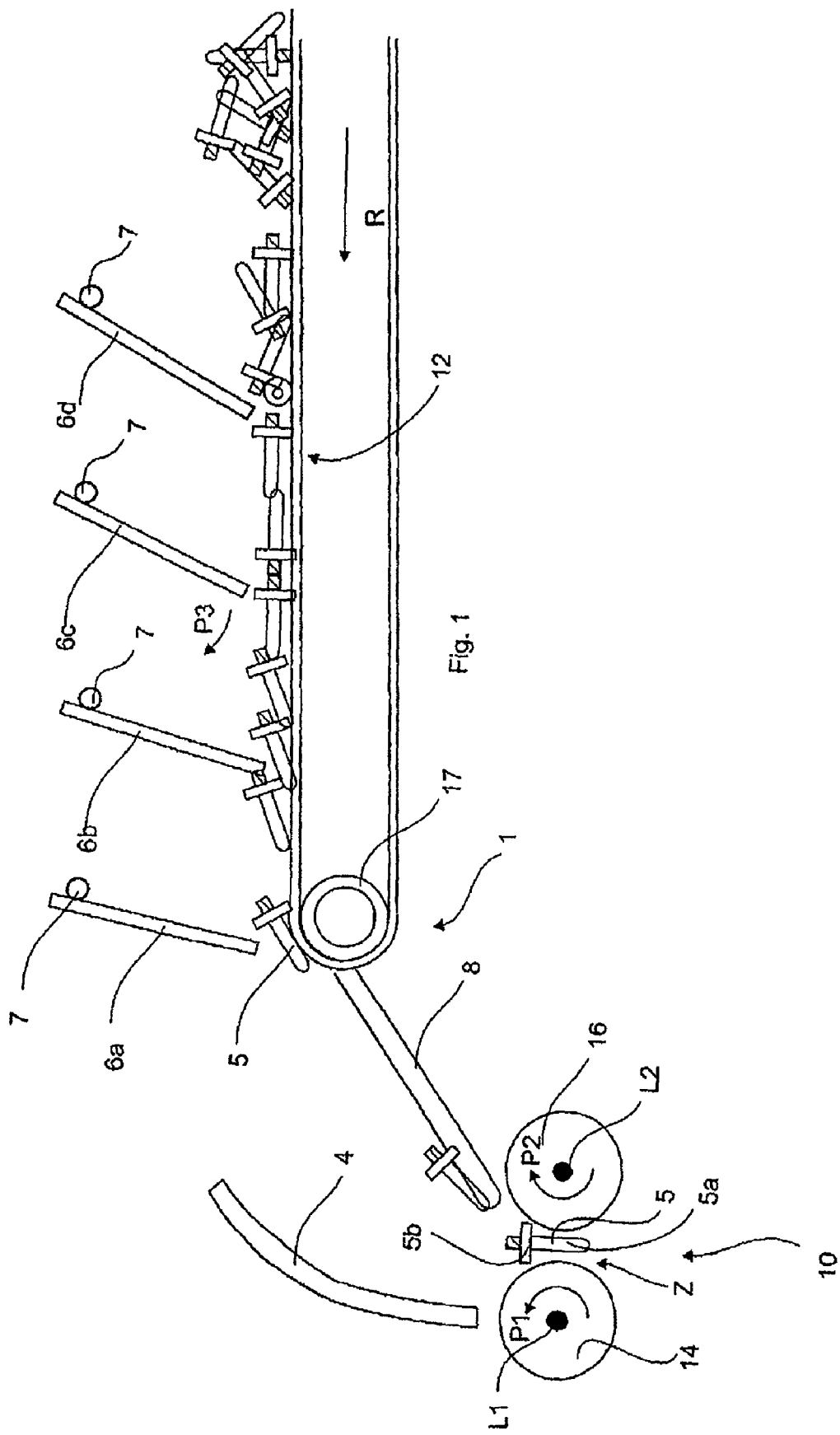
FIG. 1 shows a schematic overall view of an apparatus according to the invention for sorting piece goods.

FIG. 1 shows an apparatus according to the invention for sorting piece goods. Here, reference 10 denotes a sorting arrangement for sorting piece goods. This sorting arrangement comprises two rollers 14, 16 which are arranged next to one another, wherein an intermediate space Z is formed between the outer circumferences of these two rollers 14, 16. The size of this intermediate space Z is selected in such a way that a main body 5a of the piece goods 5 can pass through it, but a collar 5b of the piece goods, which are preforms, cannot pass through it.

The two rollers 14, 16 rotate in opposite directions in the direction shown by the arrows P1 and P2. As a result of this rotation, the piece goods are displaced along the two longitudinal directions L1 and L2. For this purpose, the two rollers 14, 16 are preferably inclined slightly with respect to the horizontal, that is to say that the two longitudinal directions L1 and L2 here are not exactly perpendicular to the plane of the figure but rather are inclined by a certain angle relative to this perpendicular direction.

Reference 4 denotes a guard device or a guard plate which causes those preforms 5 which would pass outwards for example due to the movement of the roller 14 to pass back into the intermediate space Z between the two rollers 14, 16.

Reference 12 denotes a transport device which conveys the piece goods 5 in the direction of the two rollers 14, 16. This transport device 12 is designed as a transport belt 12 which is deflected around a deflection roller 17. Arranged above the transport belt 12 are four pivotable plates 6a to 6d. These pivotable plates 6a-6d are in each case arranged such that they can pivot about pivot axles 7 in the direction of the arrow P3. While the preforms arriving on the transport belt 12 are conveyed in the transport direction R, their collars 5b in any case make contact with the individual plates 6a to 6d.

Since the centre of gravity of the individual preforms 5 is located below the collar 5b, more specifically in the region of the main body 5a, these preforms are oriented by the individual plates 6a to 6d. It can be seen that a better ordering or a better degree of sorting of the preforms 5 occurs increasingly from right to left in FIG. 1. After they have left the transport belt 12, the presorted preforms pass via a slide device 8 to the sorting arrangement 10.

FIG. 2 shows one of the plates 6a-6d. As mentioned above, this plate is mounted such that it can pivot about a pivot axle 7 or the geometric axis Y. At its lower side, the plate 6a has four recesses 11. These recesses serve to rotate the preforms 5. More specifically, the collar 5b cannot pass through in the basic position of the plate 6a, in which the latter points vertically in the direction of the transport belt 12, but rather it is necessary for this purpose to pivot these plates 6a-6d slightly.

Furthermore, it would also be possible for the individual plate 6a to be segmented, that is to say that the regions in the individual recesses 11 are at least partially also pivotable with respect to one another. Preferably, however, this plate 6a is formed in one piece. As a result, for example four preforms arrive at the sorting arrangement 10 at the same time.

In a different embodiment, the pivot axle 7 could also be arranged above the plate 6a-6d and not to the side thereof as shown in FIG. 1. Furthermore, a spring device could be provided which when necessary orients the plate 6a in its basic position. Instead of the four recesses 11 shown in FIG. 2, however, it would also be possible for more or fewer recesses 11 to be provided.

It can be seen that in FIG. 1 the plate 6a is arranged almost at the end of the transport belt 12. However, it would also be possible to arrange this plate 6a at a certain distance from the end of the transport belt 12 and the deflection roller 17 and for example to provide other guide devices in the remaining section of the path up to the deflection roller 17, such as railings or the like running in the transport direction R for guiding the row of already sorted preforms 5.

FIG. 3 relates to a slide device 8 which is arranged between the transport device 12 and the sorting arrangement 10. This slide device 8 runs at an angle here, that is to say the rows of preforms slide along this slide device solely under the effect of gravity in the direction of the sorting arrangement 10. The slide device 8 is designed here as a corrugated sheet, that is to say that the slide device 8 also has four depressions 15, along which the preforms can slide. In this way, during the sliding of the preforms 5, the latter are unable to rotate. More specifically, in the ideal case, in each case four preforms pass one behind the other between the two rollers 14, 16 and are then conveyed. Reference 18 denotes reinforced edges of the slide device 8, which may be arranged in a frame (not shown). Instead of being designed as a corrugated sheet, however, it would also be possible to provide a slide device comprising slots, through which the main bodies 5a can pass, but not the edges 5b of the preforms. In this way, given a suitable modification, it would be possible for the preforms which are already in the correct orientation to drop down between the rollers 14, 16.

Another example of such a slide device is shown in FIG. 4. Here, too, the preforms 5 are conveyed downwards along the inclined section 21 by the force of gravity, until they pass into a substantially horizontal section 22 which is arranged above the two rollers 14, 16. In this section, the slide device is configured in such a way that the preforms can drop downwards, that is to say into the intermediate space Z between the two rollers 14, 16. Reference 24 denotes an end stop for the slide device 8.

The inclined section 21 is designed in such a way that the main body 5a, but not the collar 5b, of the piece goods 5 can pass through it, and the horizontal section 22 also allows the passage of the collar 5b so that the piece goods as a whole can drop downwards.

The apparatus according to the invention for sorting preferably has a control device which is configured in such a way that no piece goods 5 are located in the inlet region between the two rollers 14, 16, that is to say in the region in which the piece goods 5 drop from the slide device 8 onto the rollers 14, 16, if the presorting is carried out above the transport belt 12.

All of the features disclosed in the application documents are claimed as essential to the invention in so far as they are novel individually or in combination with respect to the prior art.

The invention claimed is:

1. Apparatus for sorting piece goods, comprising a sorting arrangement and comprising a transport device which conveys the piece goods in the direction of the sorting arrangement, the sorting arrangement configured for sorting piece goods, each of the piece goods having a first portion and a second portion, the second portion wider than the first portion, and wherein arranged above the transport device is at least one displacement device configured to make at least temporary contact with the piece goods while they pass in proximity to the displacement device and displaces said piece goods relative to the transport device, wherein the displacement device comprises at least one plate which can pivot in the transport direction of the piece goods and wherein the at least one pivotable plate has a recess on a side facing towards the sorting arrangement and is configured in such a way so that the second portion of a piece good can become suspended within the recess after the first portion of the piece good passes through the recess.

2. Apparatus according to claim 1, wherein the sorting arrangement comprises two rollers arranged parallel to one another, wherein the rollers can rotate about their longitudinal direction and wherein the rollers are configured in such a way that the piece goods are transported along these rollers.

3. Apparatus according to claim 2, wherein the transport device is arranged so that the piece goods on the transport device are conveyed essentially perpendicular to the longitudinal direction of the rollers.

4. Apparatus according to claim 1, wherein the sorting arrangement comprises a rotatably mounted disc which in the region of its outer edge has a bar which is arranged at such a distance from the disc that the piece goods to be sorted are held between the bar and the disc and are transported, wherein the piece goods are acted upon by a centrifugal force during the sorting process due to the rotating disc.

5. Apparatus according to claim 1, wherein the displacement device comprises at least two of the plates wherein the at least two plates are arranged one behind the other and have recesses on the sides facing towards the transport device, and where the recesses are arranged one behind the other in the transport direction of the piece goods on the transport device.

6. Apparatus according to claim 1, wherein the at least one plate has a plurality of recesses located next to one another in a direction perpendicular to the transport direction.

7. Apparatus according to claim 1, wherein the transport device comprises a transport belt.

8. Apparatus according to claim 1, wherein the at least one displacement device comprises at least three pivotable plates arranged one behind the other in the transport direction of the piece goods on the transport device.

9. Apparatus according to claim 1, further comprising a slide device between the transport device and the sorting arrangement, along which the piece goods can slide from the transport device to the sorting arrangement.

10. Apparatus according to claim 9, wherein the slide device includes depressions extending between the transport device and the sorting arrangement.

11. Apparatus according to claim 1, wherein the transport device is arranged at a position that is higher than the sorting device.

12. Apparatus according to claim 1, wherein the sorting arrangement is configured for sorting of piece goods that are preformed container pieces.

13. Apparatus according to claim 1, wherein the recess is an arc-shaped recess.

14. Method for sorting piece goods each having a first portion and a second portion, the second portion wider than the first portion, wherein the piece goods are conveyed by a transport device onto a sorting arrangement, the piece goods, during transport on the transport device, being moved relative to the transport device by means of a displacement device which comprises at least one plate which can pivot in the transport direction of the piece goods, and wherein the sorting arrangement is configured in such a way so that the second portion of a piece good becomes suspended within the recess after the first portion of the piece good passes through the recess.

15. Method according to claim 14, wherein, by means of two rollers which are rotated about parallel longitudinal axis, the piece goods to be sorted on the sorting arrangement are conveyed along the longitudinal directions, wherein arranged between the two rollers is an intermediate space which receives at least a region of the piece goods.

16. Method according to claim 14, wherein the piece goods to be sorted on the sorting arrangement are sorted by means of a rotatably mounted disc which exerts a centrifugal force on the piece goods and thereby moves them to the edge region of the sorting arrangement where transport takes place between the disc and a bar arranged at a distance from this disc.

17. Method according to claim 14, wherein the piece goods are displaced relative to the transport device by a first displacement device, then rest relative to the transport device during the movement on the transport device and then are displaced relative to the transport device by a second displacement device.

18. Method according to claim 14, wherein the orientation of the piece-goods on the transport device takes place in stages by means of a plurality of pivotable plates arranged one behind another.

19. Method according to claim 14, wherein the pivotable plate comprises a recess which aligns a piece good which is transported in the direction of this recess.

20. Method according to claim 19, wherein the recess is configured in such a way that a carrier ring on the piece good is the second portion of the piece good which can become suspended within the recess after the body of the piece good passes through the recess.

\* \* \* \* \*